United States Patent [19]
Pollmeier et al.

[11] Patent Number: 5,900,724
[45] Date of Patent: May 4, 1999

[54] METHOD OF SPLITTING A POWER SUPPLY

[75] Inventors: Werner Pollmeier, Verl; Ernst Weidner, Paderborn, both of Germany

[73] Assignee: Siemens Nixdorf Informationssysteme Aktiengesellschaft, Paderborn, Germany

[21] Appl. No.: 08/930,292

[22] PCT Filed: Mar. 14, 1996

[86] PCT No.: PCT/DE96/00455

§ 371 Date: Oct. 3, 1997

§ 102(e) Date: Oct. 3, 1997

[87] PCT Pub. No.: WO96/31818

PCT Pub. Date: Oct. 10, 1996

[30] Foreign Application Priority Data

Apr. 3, 1995 [DE] Germany .......................... 195 12 459

[51] Int. Cl.⁶ .............................. G05F 5/00; G05F 1/40; H02J 1/10; H02J 1/04
[52] U.S. Cl. ........................... 323/303; 323/273; 307/44; 307/60
[58] Field of Search ..................... 323/303, 273; 307/44, 52, 53, 60, 69, 87, 131

[56] References Cited

U.S. PATENT DOCUMENTS

| | | | |
|---|---|---|---|
| 3,521,150 | 7/1970 | Bates | 323/272 |
| 4,476,399 | 10/1984 | Yoshida et al. | 307/44 |
| 4,580,090 | 4/1986 | Bailey et al. | 323/303 |
| 4,611,162 | 9/1986 | Erratico et al. | 323/303 |
| 5,570,004 | 10/1996 | Shibata | 323/303 |

FOREIGN PATENT DOCUMENTS

| | | | |
|---|---|---|---|
| 0 173 104 | 3/1986 | European Pat. Off. | G05F 1/59 |
| 1 937 714 | 1/1971 | Germany | G05F 1/46 |
| 31 34 599 | 6/1983 | Germany | H02P 13/22 |
| 33 20 885 | 12/1983 | Germany | H02J 1/10 |

*Primary Examiner*—Peter S. Wong
*Assistant Examiner*—Bao Q. Vu
*Attorney, Agent, or Firm*—Hill & Simpson

[57] ABSTRACT

Parallel circuit of power supplies, the output voltage of each power supply, in the event of the nominal current being exceeded during simultaneous operation of all the power supplies, becoming less by a predetermined amount which is greater than the tolerance of the output voltages at the nominal current.

3 Claims, 3 Drawing Sheets

METHOD OF SPLITTING A POWER SUPPLY

BACKGROUND OF THE INVENTION

1. Field of the Invention

The method relates to the parallel connection of power supplies.

2. Description of the Related Art

In order to achieve a tolerance to power drop, it has been found that parallel connection of a plurality of identically designed power supplies is expedient in power supply units. In order to achieve a longer life, it is necessary in this case to ensure that, in normal operation, the two power supplies contribute approximately the same proportion and are thus also loaded with only half the load (in the case of two power supplies).

To this end, a method is disclosed in German Patent Specification DE 33 20 885 C2, in which an additional cable is used, by means of which the power supply units regulate their output voltage to a small extent, so that the proportions are approximately equal.

However, this additional cable is not always available, particularly when parallel connection is intended to be carried out in existing wiring.

SUMMARY OF THE INVENTION

An object of the present invention is thus to connect power supplies in parallel in such a manner that they supply approximately equal proportions of the load and, apart from the necessarily connected input cables of the primary supply and the output cables, have no further connections.

This and other objects and advantages of the invention achieved in that an output characteristic is produced which has a small but defined voltage drop at half (or the envisaged proportion) of the maximum output load.

DETAILED DESCRIPTION OF THE INVENTION

Figure 1:
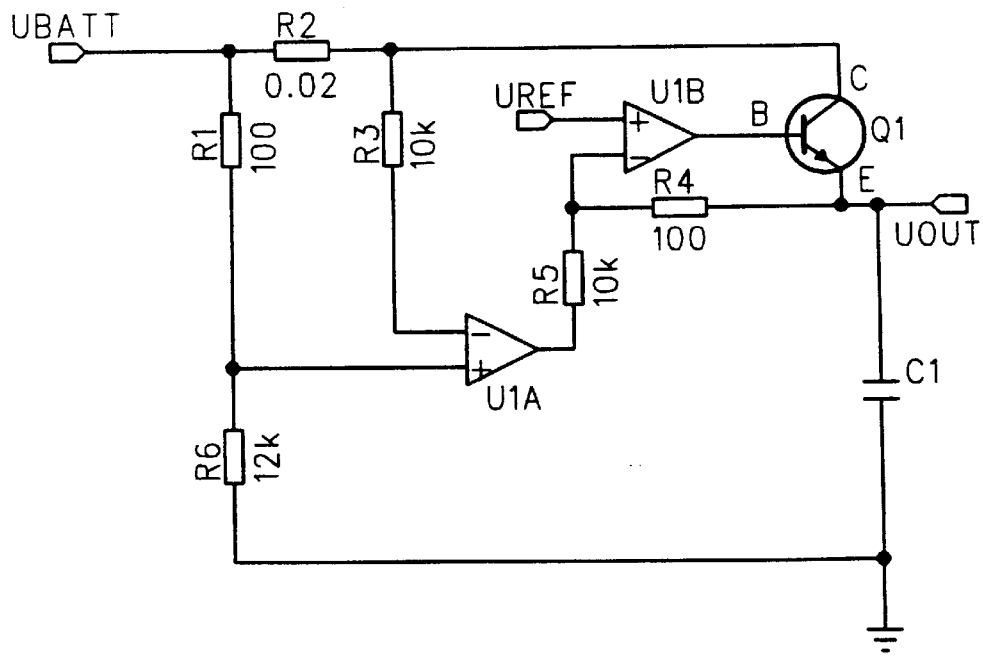
FIG. 1 shows an schematic circuit diagram for the voltage supply according to the invention.

FIG. 1 shows an schematic circuit for a voltage supply which allows parallel connection. An unregulated DC voltage Ubatt is used as the source of the supply, and is regulated by any desired control element, this being illustrated here for the sake of clarity as a transistor Q1, and is provided as Uout. This control element Q1 is controlled by an operational amplifier U1B, which mainly compares the output voltage Uout across the load with a reference voltage Uref and, in the form of a linear regulator, minimizes the error between the output voltage Uout and the reference voltage Uref. The output voltage Uout is applied, via a resistor R4, to the inverted input. The input current of the amplifier U1B does not cause any significant voltage drop across the resistor R4.

A current measuring resistor R2 is connected in the supply line to the control element T1. The voltage dropped across it is a direct measure of the current which the circuit supplies to the load. For explanation purposes only, it is assumed that the maximum current is 10 A and the reference current 5 A, that is to say that two current supplies, each providing 5 A, supply a load current of 10 A. Thus, in the desired normal case, the intention is that a current of 5 A will flow through the current measuring resistor R2, and a voltage of 0.1V will thus be dropped across it. This voltage across the resistor R2 is applied, via the resistor R3, to the inverting input of a second operational amplifier 1 A. The normal measures, known to the person skilled in the art, for suppressing oscillations, for example by frequency compensation, are not illustrated.

A comparison voltage is applied to the non-inverted input of the second amplifier U1A, this comparison voltage having been obtained by voltage division by means of the resistors R1 and R6 from the supply voltage Ubatt and, in the present example, being equal to the nominal voltage of 0.1V across the current measuring resistor R2. If the current through the current measuring resistor R2 is less than the specified nominal value of 5 A, then the output of the second amplifier will be approximately at ground. If it is greater, then it will be roughly at the supply voltage of the second amplifier. This output voltage is applied via the resistor R5 to the inverted input of the first amplifier U1B, on which the output voltage Uout is already acting, via the resistor R4. The ratio of the two resistors is the desired voltage drop at the output on half load, in the example 1%. This value is chosen such that it is greater than the maximum error (governed by manufacturing tolerances) in the output voltages of the supplies on half load, governed by the tolerance of the reference voltage Uref and the offset voltage of the amplifier U1B.

Figure 3:
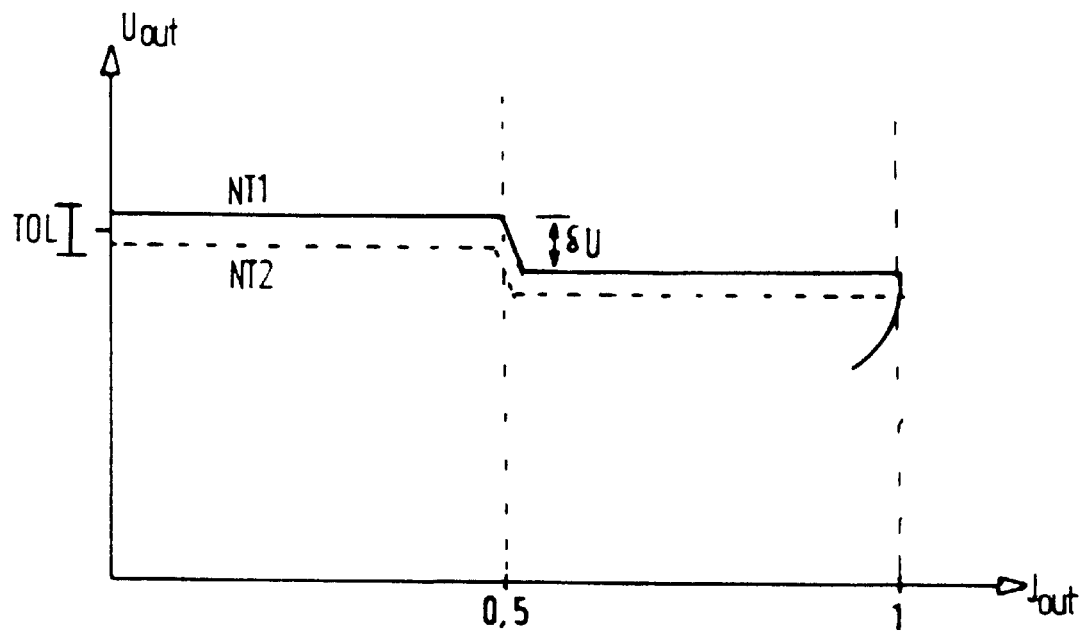
FIG. 3 shows a graph of an output characteristics of the circuit according to FIG. 1.
Figure 4:
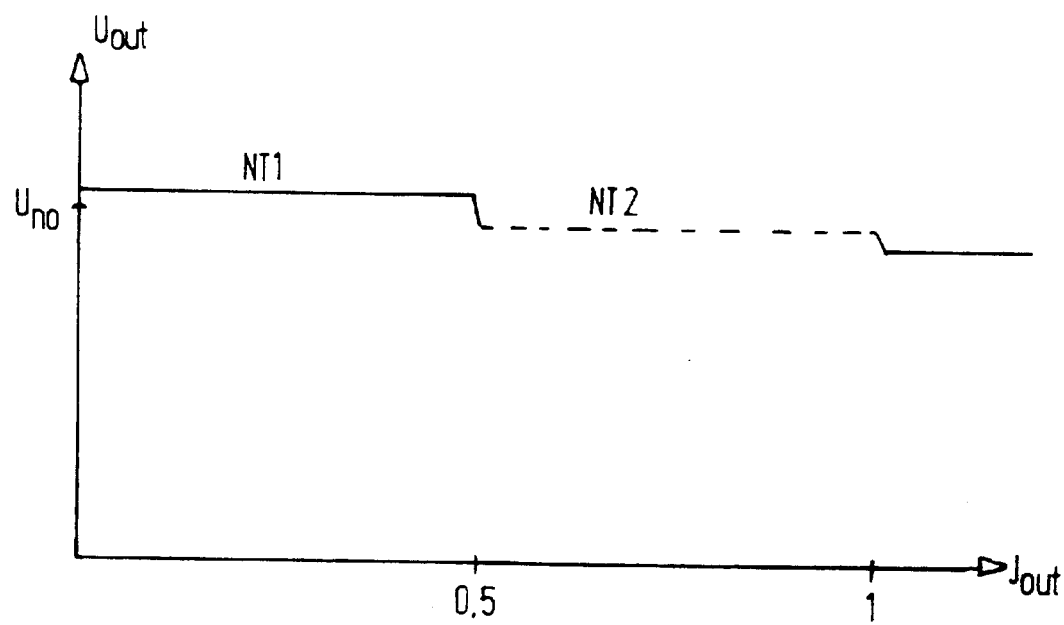
FIG. 4 shows the resultant overall characteristic.

FIG. 3 illustrates the idealized output characteristic of the arrangement according to FIG. 1. First of all, at small currents of less than half the rated load, only the power supply NT1 acts, with the randomly higher output voltage. The output voltage remains constant up to about half the current load, as is shown in FIG. 4. At half the current load, the power supply NT1 jumps by a value dU which is greater than the rated tolerance of the power supplies. The voltage produced in this way would thus fall below the output voltage of the second power supply NT2, so that this power supply NT2 now takes over the additional current requirement. The joint output voltage then remains the same up to the full nominal load. The power supply NT2 then jumps by the valude dU, so that the power supply NT1 now takes over the further supply. At 3/2 rated load, the power supply NT2 would then also contribute further to the supply, because the current limiting indicated in FIG. 3 would then act on the power supply NT1.

Figure 2:
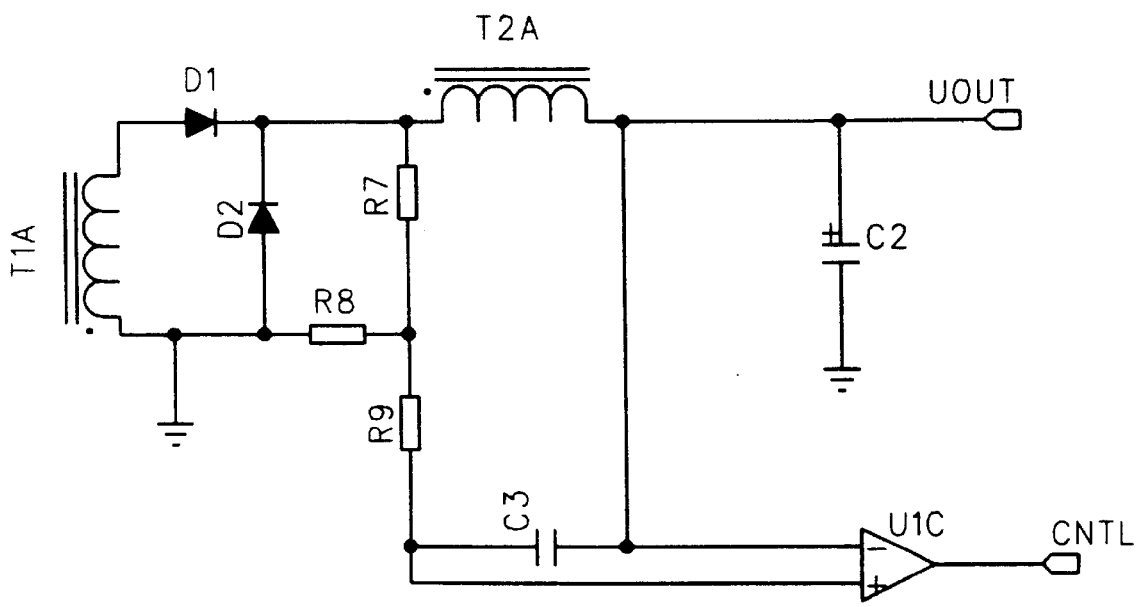
FIG. 2 shows an schematic circuit diagram for use in the invention in a switch-mode power supply.

FIG. 2 illustrates an schematic circuit diagram for use in a switch-mode voltage converter, which is connected as a forward converter. The voltage is provided by the secondary winding T1A, and is rectified by two diodes D1 and D2. Filtering is carried out by the inductor T2A, which is assisted by the filter capacitor C2. The resistance of the filter inductor T2A is used as the current measuring resistance. The voltage across the filter inductor is, on the one hand, connected to the inverting input of an operational amplifier U1C. A voltage divider comprising resistors R7 and R8 provides a comparison voltage, which is supplied via an RC filter element to the non-inverting input. The filter element composed of resistors R9 and C3 filters the AC voltage of the switch-mode power supply out and has a time constant in the tenth of a second region. A voltage which is a measure of the output current thus appears at the output of the operational amplifier U1C.

If the amplifier U1C, as illustrated, is operated without any negative feedback, the signal is a digital signal which indicates, for example, that half the rated current has been exceeded and is supplied to the controller of the switch-mode power supply, in order to reduce its output voltage slightly, as has already been illustrated with reference to FIG. 1. In the case of a mains-power switch-mode voltage converter, this signal will initially be transmitted, for example by an optocoupler, to the primary side, and then act on the control loop there.

Figure 5:
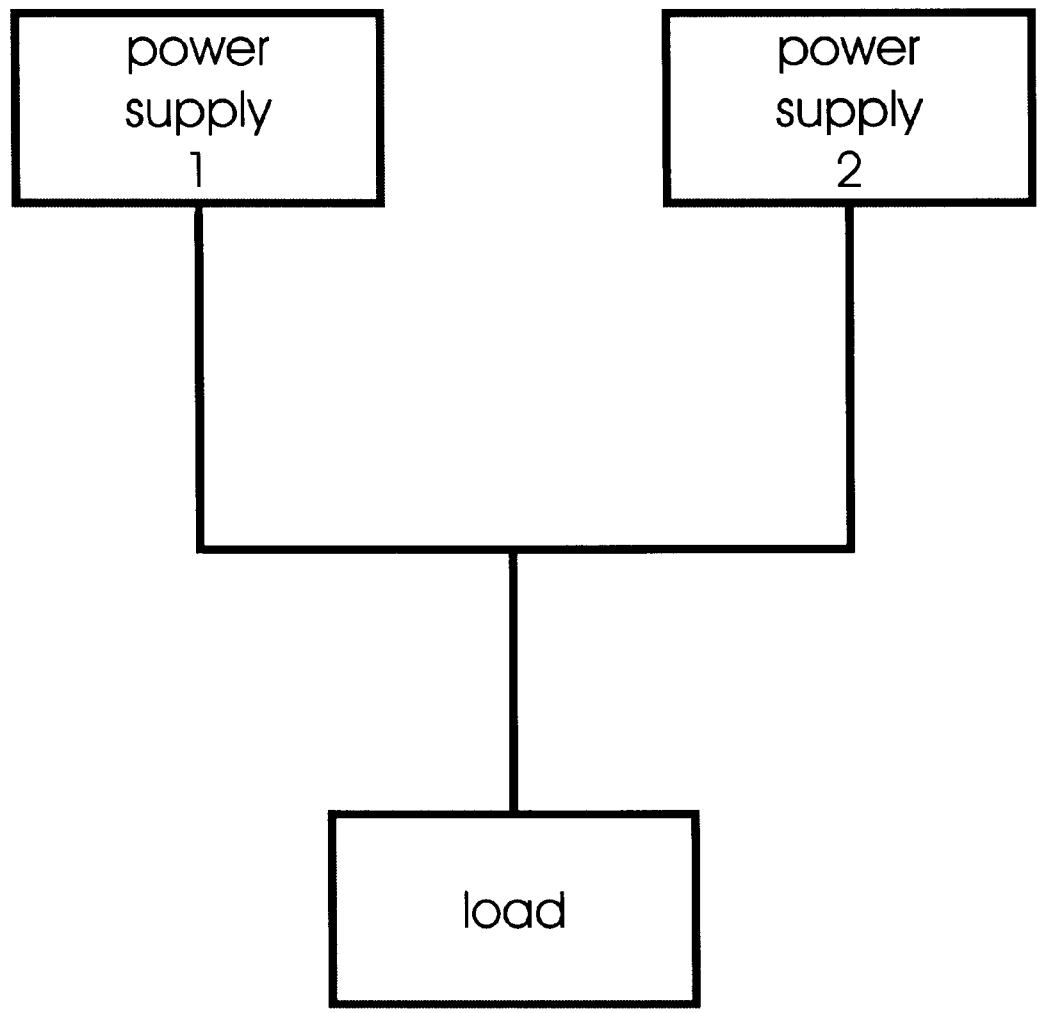
FIG. 5 is a schematic block diagram of two power supplies connected in parallel to a load.

In FIG. 5 is shown a block diagram illustrating two power supplies 1 and 2 connected in parallel to a load 3. The power supplies 1 and 2 correspond to the power supplies shown in FIG. 1 or FIG. 2.

Although other modifications and changes may be suggested by those skilled in the art, it is the intention of the inventors to embody within the patent warranted hereon all changes and modifications as reasonably and properly come within the scope of their contribution to the art.

We claim:

1. An arrangement for equal loading of at least two voltage supply units which supply a load directly by parallel connection, comprising
    at least two voltage supply units connected in parallel to a load;
    a control circuit for each of the at least two voltage supply units which reduces an output voltage by a predetermined amount which is greater than a rated tolerance of the output voltage when an output current exceeds a predetermined threshold which is equal to a nominal current of the load divided by the number of the at least two parallel-connected voltage supply units so that said control circuit causes said at least two voltage supply units to operate simultaneously above said predetermined threshold.

2. An arrangement as claimed in claim 1, further comprising:
    a current measuring resistance connected to a voltage to provide a voltage drop which is proportional to an output current,
    means for comparing the voltage drop with a value corresponding to the predetermined threshold,
    a regulating circuit for regulating the output voltage if the predetermined threshold is exceeded, said regulating circuit reduces the output voltage by more than the rated tolerance with a steep gradient.

3. An arrangement as claimed in claim 2, wherein at least one of the voltage supply units is a switch-mode voltage converter with a filter inductor, and resistance of the filter inductor being used as the current measuring resistance.

* * * * *